(12) United States Patent
Harrison et al.

(10) Patent No.: US 7,378,033 B2
(45) Date of Patent: May 27, 2008

(54) CREASE-RESISTANT COMPOSITION COMPRISING A COPOLYMER OF CONTROLLED ARCHITECTURE, FOR ARTICLES MADE OF TEXTILE FIBERS

(75) Inventors: Ian Harrison, Poissy (FR); Mathias Destarac, Paris (FR); Cédric Geffroy, Poitiers (FR)

(73) Assignee: Rhodia Chimie (FR)

( * ) Notice: Subject to any disclaimer, the term of this patent is extended or adjusted under 35 U.S.C. 154(b) by 119 days.

(21) Appl. No.: 10/534,197

(22) PCT Filed: Oct. 27, 2003

(86) PCT No.: PCT/FR03/03183

§ 371 (c)(1), (2), (4) Date: Apr. 13, 2006

(87) PCT Pub. No.: WO2004/044114

PCT Pub. Date: May 27, 2004

(65) Prior Publication Data

US 2007/0094809 A1   May 3, 2007

(30) Foreign Application Priority Data

Nov. 7, 2002   (FR) .................................. 02 13950

(51) Int. Cl.
*C11D 3/37*   (2006.01)
*C11D 3/00*   (2006.01)
*D06M 15/19*   (2006.01)

(52) U.S. Cl. ................... 252/8.61; 8/115.51; 252/8.62; 252/8.63; 442/107; 510/475; 510/513; 510/522

(58) Field of Classification Search ............... 252/8.61, 252/8.62, 8.63; 8/115.51; 442/107; 510/475, 510/513, 522
See application file for complete search history.

(56) References Cited

U.S. PATENT DOCUMENTS 6,271,192 B1 * 8/2001 Verstrat et al. ............. 510/527
6,465,416 B2 * 10/2002 Verstrat et al. ............. 510/475
7,071,156 B2 * 7/2006 Aubay et al. ................ 510/475
2002/0065208 A1 * 5/2002 Aubay et al. ................ 510/475
2002/0132748 A1 * 9/2002 Altmann et al. ............ 510/276
2004/0025262 A1 * 2/2004 Hamers et al .............. 8/115.51
2004/0038851 A1 * 2/2004 Aubay et al. ................ 510/475

FOREIGN PATENT DOCUMENTS

| WO | WO9630421 | 10/1996 |
|---|---|---|
| WO | WO9801478 | 1/1998 |
| WO | WO9858974 | 12/1998 |
| WO | WO9903894 | 1/1999 |
| WO | WO9931144 | 6/1999 |
| WO | WO0002939 | 1/2000 |
| WO | WO0037507 | 6/2000 |
| WO | WO0039169 | 7/2000 |
| WO | WO0071591 A1 | 11/2000 |
| WO | WO0071660 A1 | 11/2000 |
| WO | WO0075207 A1 | 12/2000 |
| WO | WO0142312 A1 | 6/2001 |
| WO | WO0210223 A2 | 2/2002 |
| WO | WO0226836 A2 | 4/2002 |

* cited by examiner

*Primary Examiner*—Anthony J Green
(74) *Attorney, Agent, or Firm*—Hunton & Williams LLP

(57) ABSTRACT

An aqueous or aqueous-alcoholic crease-resistant formulation comprising a cationic surfactant (CSA), for the treatment after washing in aqueous or aqueous-alcoholic medium of articles made of textile fibers, said formulation also comprising a soluble or dispersible copolymer of controlled architecture (C) that is compatible with the surfactant (CSA) at the pH of said formulation and at the pH of use of said formulation, and comprising at least one nonionic hydrophobic organic polymer block B, and at least one ionic or ionizable organic polymer block A, the copolymer (C) making possible to give said articles properties of crease resistance and/or of ease of ironing.

30 Claims, No Drawings

CREASE-RESISTANT COMPOSITION COMPRISING A COPOLYMER OF CONTROLLED ARCHITECTURE, FOR ARTICLES MADE OF TEXTILE FIBERS

This application is an application under 35 U.S.C. Section 371 of International Application Number PCT/FR2003/003183 filed on Oct. 27, 2003.

The present invention relates to an aqueous or aqueous-alcoholic crease-resistant formulation for the post-washing treatment (for rinsing or ironing) of articles made of textile fibers (in particular laundry), comprising at least one cationic surfactant and an organic copolymer of controlled architecture comprising at least one hydrophobic organic polymer block and at least one hydrophilic organic polymer block whose overall charge is zero or not opposite that of the cationic surfactant in the formulation and the treatment medium; the invention also relates to the use, in an aqueous or aqueous-alcoholic formulation, for the post-washing treatment (for rinsing or ironing) of articles made of textile fibers (in particular laundry), comprising at least one cationic surfactant and said copolymer as agent for giving the articles properties of crease resistance or ease of ironing.

Copolymers comprising one or more cationic or potentially cationic blocks and one or more other blocks have already been described as agents for improving the foaming of formulations for washing up or washing laundry by hand, cosmetic skin or hair cleansing formulations, or formulations in other fields (WO 00/71591 and WO 00/71660).

The Applicant has now found that the presence, in an aqueous or aqueous-alcoholic formulation comprising at least one cationic surfactant, for the post-washing treatment (for rinsing or ironing) of articles made of textile fibers (in particular laundry), of an organic copolymer of controlled architecture comprising at least one hydrophobic organic polymer block B and at least one hydrophilic organic polymer block whose overall charge is zero or not opposite that of the cationic surfactant in the formulation and the treatment medium, makes it possible to give said articles properties of crease resistance and/or ease of ironing.

A first subject of the invention consists of an aqueous or aqueous-alcoholic crease-resistant formulation comprising at least one cationic surfactant (CSA), for the treatment after washing in aqueous or aqueous-alcoholic medium of articles made of textile fibers, said formulation being characterized in that it also comprises at least one copolymer of controlled architecture (C) that is soluble or dispersible in aqueous or aqueous-alcoholic medium, compatible with the surfactant (CSA) at the pH of said formulation and at the pH of use of said formulation, and comprising at least one hydrophobic organic polymer block B, which is essentially nonionic, and at least one ionic or ionizable organic polymer block A, the weight ratio: set of blocks B/set of blocks A ranging from 0.01 to 1 and preferably from 0.1 to 1, said copolymer of controlled architecture (C) being present in the formulation in an amount that can give said articles properties of crease resistance and/or ease of ironing.

Said formulation may be:

a rinsing composition, which is in the form of a concentrated aqueous solution or dispersion, capable of forming, by dilution, a rinsing bath, to be placed in contact with the articles to be rinsed, said articles having especially been subjected beforehand to a main washing operation; or an aqueous ironing composition in the form of an aqueous solution or dispersion, to be deposited directly, without dilution, for example by vaporization, onto the dry articles to be ironed.

A second subject of the invention consists of the use, in an aqueous or aqueous-alcoholic formulation comprising at least one cationic surfactant (CSA), for the post-washing treatment of articles made of textile fibers, of at least one copolymer of controlled architecture (C) that is soluble or dispersible in aqueous or aqueous-alcoholic medium, compatible with the surfactant (CSA) at the pH of said formulation and at the pH of use of said formulation, and comprising at least one hydrophobic organic polymer block B, which is essentially nonionic, and at least one ionic or ionizable organic polymer block A, the weight ratio: set of blocks B/set of blocks A ranging from 0.01 to 1 and preferably from 0.1 to 1, as an agent for giving said articles properties of crease resistance and/or ease of ironing.

The term "copolymer of controlled architecture" means herein any copolymer comprising at least two different polymer blocks, said copolymer possibly being:

linear ("block" copolymer)

branched (comb or grafted copolymer)

or in star form.

The linear "block" copolymers more particularly have a structure comprising two blocks (diblock) or three blocks (triblock).

The copolymers of controlled architecture and of branched structure (comb or grafted) preferably have a hydrophobic skeleton of polymer B comprising pendent segments of polymer A.

As regards the copolymers of controlled architecture and of star structure, several possibilities may be envisioned.

Thus, at least one arm of the star is a block B, the other arms being made of a block A, or vice versa; or alternatively at least one arm of the star is made of at least one block B and of at least one block A, the other arms being made of a block B or of a block A, or vice versa; or alternatively preferably, each arm of the star is made of at least one block B and of at least one block A.

It is pointed out that each block of the copolymer of controlled architecture (C) may consist of a homopolymer or a random or block copolymer or alternatively may have a concentration gradient of the monomers along the chain of the block under consideration.

Preferably, said copolymer of controlled architecture (C) is a "block" copolymer, especially a diblock copolymer A-B.

The pH of the formulation in which said copolymer of controlled architecture (C) is present according to the invention may range from 2.5 to 11.

The pH of use of said formulation may range from 5 to 10, according to the desired use.

When it is a rinsing formulation, the pH of the rinsing bath is generally from about 10 to 6, the pH of said bath decreasing gradually with the successive rinsing steps of the rinsing operation or, in contrast, increasing gradually with the successive rinsing steps of the rinsing operation when it is an acidic rinsing formulation;

an ironing formulation, the pH of said formulation is generally from about 5 to 9.

The nature of the blocks A and B and the relative amounts of the blocks A and B are such that said copolymer of controlled architecture (C) is soluble or dispersible in aqueous or aqueous-alcoholic medium, and compatible with the cationic surfactant (CSA), whether it is at the pH of said formulation or at the pH of use of said formulation.

The expression "soluble or dispersible copolymer of controlled architecture (C)" means that said copolymer (C) does not form in the medium under consideration a two-phase macroscopic solution under the conditions of use. The term "compatible with the cationic surfactant (CSA)" means herein that said copolymer is not liable to result in the formation of aggregates in nondispersed form in the medium under consideration comprising said cationic surfactant (CSA).

Preferably, the overall charge of the copolymer (C) is zero or not opposite that of the cationic surfactant (CSA), whether it is at the pH of the formulation or at the pH of use of the formulation.

The term "hydrophobic" is used in its usual sense as meaning "which has no affinity for water"; as regards the block B, this means that the organic polymer of which it is formed, taken alone, would form a two-phase macroscopic solution in distilled water at 25° C.

The term "hydrophilicity" is also used in its usual sense as meaning "which has affinity for water", i.e. is not liable to form a two-phase macroscopic solution in distilled water at 25° C.

Preferably, the blocks A and B are derived from ethylenically unsaturated monomers.

As regards the blocks A and B, the term "polymer" will be used to denote both homopolymers and copolymers.

Similarly, "block A" or "block B" denotes, respectively, all of the blocks A or all of the blocks B, whether it is a linear "block" (diblock or multiblock), branched or star copolymer (C).

Block B is a hydrophobic polymer. Preferably, it is essentially nonionic or nonionizable at the pH of the formulation or of use of said composition. Most preferably, it is nonionic.

Said hydrophobic polymer constituting the block B is derived from at least one hydrophobic nonionic monomer.

Said polymer may also contain hydrophilic nonionic units derived from at least one hydrophilic nonionic monomer, in an amount that is low enough to allow the block to maintain its hydrophobic nature; this amount may be up to 10 mol % of all of the monomers from which said block B is derived.

Similarly, said polymer may also contain ionic or potentially ionic (especially cationic or potentially cationic) units derived from at least one ionic or potentially ionic (especially cationic or potentially cationic) monomer, in minor amount, such that said polymer maintains its hydrophobic and essentially nonionic nature; this amount may be up to 10 mol % of all of the monomers from which said block B is derived.

As examples of hydrophobic nonionic monomers from which the block B may be derived, mention may be made of:
vinylaromatic monomers such as styrene, α-methylstyrene, vinyltoluene, etc.
vinyl or vinylidene halides, for instance vinyl chloride or vinylidene chloride $C_1$-$C_{12}$ alkyl esters of α,β-monoethylenically unsaturated acids such as methyl, ethyl or butyl acrylates and methacrylates, 2-ethylhexyl acrylate, etc.
vinyl or allylic esters of saturated carboxylic acids such as vinyl or allyl acetates, propionates, versatates, stearates, etc.
α,β-monoethylenically unsaturated nitriles containing from 3 to 12 carbon atoms, for instance acrylonitrile, methacrylonitrile, etc.
α-olefins, for instance ethylene, etc.
conjugated dienes, for instance butadiene, isoprene, chloroprene, etc.

As examples of possible nonionic hydrophilic monomers, mention may be made of:
hydroxyalkyl esters of α,β-ethylenically unsaturated acids, for instance hydroxyethyl or hydroxypropyl acrylates and methacrylates, glyceryl mono-methacrylate, etc.
α,β-ethylenically unsaturated amides, for instance acrylamide, N,N-dimethylmethacrylamide, N-methylolacrylamide, etc.
α,β-ethylenically unsaturated monomers bearing a water-soluble polyoxy-alkylene segment of the polyethylene oxide type, for instance polyethylene oxide a-methacrylates (Bisomer S20W, S10W, etc. from Laporte) or α,ω-dimethacrylates, Sipomer BEM from Rhodia (ω-behenyl polyoxyethylene methacrylate), Sipomer SEM-25 from Rhodia (ω-tristyrylphenyl polyoxy-ethylene methacrylate), etc.
α,β-ethylenically unsaturated monomers that are precursors of hydrophilic units or segments such as vinyl acetate, which, once polymerized, can be hydrolyzed to generate vinyl alcohol units or polyvinyl alcohol segments
vinylpyrrolidones
α,β-ethylenically unsaturated monomers of ureido type and in particular 2-imidazolidinoneethyl methacrylamide (Sipomer WAM II from Rhodia).

Examples of ionic or potentially ionic monomers that may be used in minor amount are mentioned later (regarding block A).

The number-average molecular mass of the hydrophobic block(s) B may range from 500 to 100 000 and preferably from 500 to 25 000 g/mol, measured by steric exclusion chromatography.

The polymer block A is ionic or ionizable.

Its overall charge at the pH of the formulation or of use of the formulation is such that the copolymer (C) is compatible with the surfactant (CSA).

Preferably, the overall charge of the polymer block A is zero or not opposite that of the cationic surfactant (CSA) when the overall charge of the block polymer B is zero in this same pH range.

When the polymer block B has, in this same pH range, an ionic charge, this charge is to be taken into account in the choice of the block A, in order for the copolymer (C) to be compatible with the surfactant (CSA) and preferably has an overall charge that is zero or not opposite that of the cationic surfactant (CSA).

The polymer constituting the block A may be chosen from
a) polymers derived from at least one hydrophilic monomer that is potentially cationic at the pH of the formulation or of use of the formulation and/or at least one cationic hydrophilic monomer, and optionally of at least one nonionic monomer;

b) polymers derived from at least one zwitterionic hydrophilic monomer and optionally from at least one nonionic monomer.

The nature and amount of the possible nonionic units present in the block A are such that the copolymer (C) is soluble or dispersible in aqueous or aqueous-alcoholic medium.

These nonionic units are derived from at least one nonionic monomer, in an amount that can represent up to 80 mol % of the monomer composition from which the polymer constituting the block A is derived.

Said polymer constituting the block A may also contain anionic or potentially anionic units derived from at least one anionic or potentially anionic monomer. The amount of possible anionic or potentially anionic units is such that the copolymer (C) remains compatible with the surfactant (CSA) and, preferably, such that the overall charge of the copolymer (C) is zero or not opposite that of the cationic surfactant (CSA), or alternatively such that the overall charge of said block A is zero or not opposite that of the cationic surfactant (CSA) when the charge of the block B is zero.

Most preferably, the hydrophobic block B is nonionic and the ionic or ionizable block A has an overall charge that is zero or not opposite that of the cationic surfactant (CSA) at the pH of the formulation or of use of the formulation.

As examples of potentially cationic hydrophilic monomers, mention may be made of:

N,N-(dialkylamino-w-alkyl)amides of α,β-monoethylenically unsaturated carboxylic acids, for instance N,N-dimethylaminomethyl-acrylamide or -methacrylamide, 2-(N,N-dimethylamino)ethyl-acrylamide or -methacrylamide, 3-(N,N-dimethylamino)propyl-acrylamide or -methacrylamide and 4-(N,N-dimethylamino)butyl-acrylamide or -methacrylamide α,β-monoethylenically unsaturated amino esters, for instance 2-(dimethylamino)ethyl acrylate (DMAEA), 2-(dimethylamino)ethyl methacrylate (DMAEMA), 3-(dimethylamino)propyl methacrylate, 2-(tert-butylamino)ethyl methacrylate, 2-(dipentylamino)ethyl methacrylate or 2-(diethylamino)ethyl methacrylate vinylpyridines vinylamine vinylimidazolines monomers that are precursors of amino functions such as N-vinylformamide, N-vinylacetamide, etc., which give rise to primary amine functions by simple acidic or basic hydrolysis.

As examples of cationic hydrophilic monomers, mention may be made of:

ammonium acryloyl or acryloyloxy monomers, for instance trimethyl-ammonium propyl methacrylate chloride, trimethylammonium ethylacrylamide or methacrylamide chloride or bromide, trimethylammonium butylacrylamide or methacrylamide methyl sulfate, trimethylammonium propylmethacrylamide methyl sulfate (MES), (3-methacrylamidopropyl)trimethylammonium chloride (MAPTAC), (3-acrylamidopropyl)trimethylammonium chloride (APTAC), methacryloyloxyethyltrimethylammonium chloride or methyl sulfate, and acryloyloxyethyltrimethylammonium chloride;

1-ethyl-2-vinylpyridinium or 1-ethyl 4-vinylpyridinium bromide, chloride or methyl sulfate;

N,N-dialkyldiallylamine monomers, for instance N,N-dimethyldiallylammonium chloride (DADMAC);

polyquaternary monomers, for instance dimethylaminopropylmethacrylamide chloride, N-(3-chloro-2-hydroxypropyl)trimethylammonium chloride (DIQUAT), etc.

As examples of zwitterionic monomers, mention may be made of:

sulfobetaine monomers, for instance sulfopropyl dimethylammonium ethyl methacrylate (SPE from Raschig), sulfopropyl dimethylammonium propyl methacrylamide (SPP from Raschig) and sulfopropyl 2-vinylpyridinium (SPV from Raschig)

phosphobetaine monomers, for instance phosphatoethyltrimethylammonium ethyl methacrylate carboxybetaine monomers.

Examples of hydrophilic or hydrophobic nonionic monomers have already been mentioned above (regarding the block B).

As examples of anionic or potentially anionic monomers, mention may be made of:

monomers containing at least one carboxylic function, for instance α,β-ethylenically unsaturated carboxylic acids or the corresponding anhydrides, such as acrylic, methacrylic or maleic acid or anhydride, fumaric acid, itaconic acid, N-methacryloyl alanine and N-acryloylglycine and the water-soluble salts thereof monomers that are precursors of carboxylate functions, for instance tert-butyl acrylate, which generate, after polymerization, carboxylic functions by hydrolysis monomers containing at least one sulfate or sulfonate function, for instance 2-sulfooxyethyl methacrylate, vinylbenzenesulfonic acid, allylsulfonic acid, 2-acrylamido-2-methylpropanesulfonic acid, sulfoethyl acrylate or methacrylate, and sulfopropyl acrylate or methacrylate, and the water-soluble salts thereof monomers containing at least one phosphonate or phosphate function, for instance vinylphosphonic acid, etc., ethylenically unsaturated phosphate esters such as the phosphates derived from hydroxyethyl methacrylate (Empicryl 6835 from Rhodia) and those derived from polyoxyalkylene methacrylates, and the water-soluble salts thereof.

The number-average molecular mass of the hydrophilic block(s) (A) may range from 500 to 100 000 and preferably from 500 to 25 000 g/mol, measured by steric exclusion chromatography.

In particular, the number-average molar mass of the copolymer of controlled architecture (C) is between 1000 and 200 000 g/mol, preferably between 1000 and 50 000 g/mol and more particularly between 3000 and 30 000 g/mol, determined by GPC coupled to the MALLS method (Multi Angle Laser Light Scattering).

As examples of diblock copolymers (C), mention may be made especially of the following copolymers:

polybutyl acrylate—poly(2-dimethylaminoethyl acrylate), optionally quaternized polybutyl acrylate—poly(acrylic acid-stat-quaternized 2-dimethylaminoethyl acrylate).

As mentioned above, the copolymer of controlled architecture (C) may be in a linear (multiblock) form, in a branched (comb or grafted) form, or in a star form; it is preferably a linear copolymer, preferably a structure comprising two blocks (diblock) or three blocks (triblock), most particularly diblocks. Each block of the copolymer may be formed from a homopolymer or a random or block copolymer.

Said block copolymers in linear form may be obtained by any known method, whether by controlled or noncontrolled free-radical polymerization, by ring-opening polymerization (especially anionic or cationic), by anionic or cationic polymerization, or by chemical modification of a polymer.

Preferably, living or controlled free-radical polymerization methods are used. As examples of living or controlled polymerization processes, reference may be made especially to:

the processes of patent applications WO 98/58974, WO 00/75207 and WO 01/42312 which use a free-radical polymerization controlled with control agents of xanthate type, the process of free-radical polymerization controlled with control agents of dithioester type, of patent application WO 98/01478, the process of free-radical polymerization controlled with control agents of dithiocarbamate type, of patent application WO 99/31144, the process of free-radical polymerization controlled with control agents of dithiocarbazate type, of patent application WO 02/26836, the process of free-radical polymerization controlled with control agents of dithiophosphorester type, of patent application WO 02/10223, (optionally, the block copolymers obtained as above by controlled free-radical polymerization may undergo a reaction for purification of their sulfur-chain end, for example via processes of hydrolysis, oxidation, reduction, pyrolysis or substitution type), the process of patent application WO 99/03894 which uses a polymerization in the presence of nitroxide precursors, the process of patent application WO 96/30421 which uses an atom-transfer radical polymerization (ATRP), the process of free-radical polymerization controlled with control agents of iniferter type according to the teaching of Otu et al., Makromol. Chem. Rapid. Commun., 3, 127 (1982), the process of free-radical polymerization controlled by degenerative transfer of iodine according to the teaching of Tatemoto et al., Jap. 50, 127, 991 (1975), Daikin Kogyo Co Ltd Japan and Matyjaszewski et al., Macromolecules, 28, 2093 (1995), the process of free-radical polymerization controlled with tetraphenylethane derivatives, disclosed by D. Braun et al. in Macromol. Symp. 111, 63 (1996), or alternatively the process of free-radical polymerization controlled with organocobalt complexes described by Wayland et al. in J. Am. Chem. Soc. 116, 7973 (1994)

the process of free-radical polymerization controlled with diphenyl ether (WO 00/39169 or WO 00/37507).

When they are grafted or comb copolymers of controlled architecture, they may be obtained via methods known as direct grafting and copolymerization. Direct grafting consists in free-radical polymerization of the chosen monomer(s), in the presence of the selected polymer to form the skeleton of the final product. If the monomer/skeleton couple and the operating conditions are carefully chosen, then a transfer reaction can take place between the growing macroradical and the skeleton. This reaction generates a radical on the skeleton, and it is from this radical that the graft grows. The primary radical derived from the initiator may also contribute toward the transfer reactions.

As regards copolymerization, it involves in a first state the grafting onto the end of the future pendent segment of a free-radical-polymerizable function. This grafting may be performed via usual methods of organic chemistry. Next, in a second stage, the macromonomer thus obtained is polymerized with the chosen monomer to form the skeleton and a "comb" polymer is obtained.

The grafting may advantageously be performed in the presence of a polymerization control agent as cited in the above references.

The processes for preparing polymers in star form may be classified essentially into two groups. The first corresponds to the formation of the arms of the polymers using a multifunctional compound constituting the core ("core-first" technique) (Kennedy, J. P. et al. Macromolecules, 29, 8631 (1996), Deffieux, A. et al. Ibid, 25, 6744, (1992), Gnanou, Y. et al. Ibid, 31, 6748 (1998)) and the second corresponds to a method in which the polymer molecules that will constitute the arms are first synthesized and then linked together on a core to form a polymer in star form ("arm-first" technique).

As an example of a synthesis of this type of polymer, reference may be made to patent WO 00/02939.

According to the invention, the formulation comprises a cationic surfactant (CSA).

The term "cationic surfactant (CSA)" means herein either a cationic surfactant or a mixture of cationic surfactants, and also a mixture of at least one cationic surfactant and of at least one nonionic surfactant; the optional amount of nonionic surfactant may represent up to 70% of the weight of the combination of surfactants (CSA).

Most preferably, the formulation according to the invention does not contain any anionic surfactant.

Among the cationic surfactants that may especially be mentioned are the quaternary ammonium salts of formula

in which $R^1$, $R^2$ and $R^3$, which may be identical or different, represent H or an alkyl group containing fewer than 4 carbon atoms, preferably 1 or 2 carbon atom(s), optionally substituted with one or more hydroxyl function(s), or can form with the nitrogen atom $N^+$ at least one aromatic or heterocyclic ring $R^4$ represents a $C_8$-$C_{22}$ and preferably $C_{12}$-$C_{22}$ alkyl or alkenyl group, or an aryl or benzyl group, and $X^-$ is a solubilizing anion such as halide (for example chloride, bromide or iodide), sulfate or alkyl sulfate (methyl sulfate), carboxylate (acetate, propionate or benzoate), or alkyl- or arylsulfonate.

Mention may be made in particular of dodecyltrimethylammonium, tetradecyl-trimethylammonium or cetyltrimethylammonium bromide, stearylpyridinium chloride, Rhodaquat® TFR and Rhodamine® C15 sold by Rhodia, cetyltrimethylammonium chloride (Dehyquart ACA and/or AOR from Cognis), and cocobis(2-hydroxyethyl)ethylammonium chloride (Ethoquad C12 from Akzo Nobel).

Mention may also be made of other cationic surfactants with softening properties, for instance:

the quaternary ammonium salts of formula

in which

R$^{1'}$ and R$^{2'}$, which may be identical or different, represent H or an alkyl group containing fewer than 4 carbon atoms, preferably 1 or 2 carbon atom(s), optionally substituted with one or more hydroxyl function(s), or can form, together with the nitrogen atom N$^+$, a heterocyclic ring R$^{3'}$ and R$^{4'}$ represent a C$_8$-C$_{22}$ and preferably C$_{10}$-C$_{22}$ alkyl or alkenyl group or an aryl or benzyl group, and X$^-$ is an anion such as halide (for example chloride, bromide or iodide), sulfate or alkyl sulfate (methyl sulfate), carboxylate (acetate, propionate or benzoate), or alkyl- or arylsulfonate.

Mention may be made in particular of: dialkyldimethylammonium chlorides, for instance ditallowdimethylammonium chloride or methyl sulfate, etc., and alkylbenzyldimethylammonium chlorides, C$_{10}$-C$_{25}$alkylimidazolium salts, for instance C$_{10}$-C$_{25}$alkylimidazolinium methyl sulfates substituted polyamine salts, for instance N-tallow-N,N', N'-triethanol-1,3-propylenediamine dichloride or dimethyl sulfate, and N-tallow-N,N,N',N',N'-pentamethyl-1,3-propylenediamine dichloride.

Among the nonionic surfactants that may be present in the formulation according to the invention, mention may be made especially of:

polyoxyalkylenated (polyoxyethylenated, polyoxypropylenated or polyoxy-butylenated) alkylphenols whose alkyl substituent is of C$_6$-C$_{12}$ and which contain from 5 to 25 oxyalkylene units; examples that may be mentioned include Triton X-45, X-114, X-100 or X-102 sold by Rohm & Haas Co.;

glucosamide, glucamide or glycerolamide;

polyoxyalkylenated C$_8$-C$_{22}$ aliphatic alcohols containing from 1 to 25 oxyalkylene (oxyethylene or oxypropylene) units; examples that may be mentioned include Tergitol 15-S-9 and Tergitol 24-L-6 NMW sold by Union Carbide Corp., Neodol 45-9, Neodol 23-65, Neodol 45-7 and Neodol 45-4 sold by Shell Chemical Co., and Kyro EOB sold by The Procter & Gamble Co.;

products resulting from the condensation of ethylene oxide, the compound resulting from the condensation of propylene oxide with propylene glycol, such as the Pluronic products sold by BASF;

products resulting from the condensation of ethylene oxide, the compound resulting from the condensation of propylene oxide with ethylenediamine, such as the tetronic products sold by BASF;

amine oxides such as C$_{10}$-C$_{18}$ alkyl dimethylamine oxides and C$_8$-C$_{22}$ alkoxy ethyl dihydroxyethylamine oxides;

the alkylpolyglycosides described in U.S. Pat. No. 4,565, 647;

C$_8$-C$_{20}$ fatty acid amides;

ethoxylated fatty acids;

ethoxylated fatty amides;

ethoxylated amines;

amine oxides.

The formulation according to the invention is an aqueous or aqueous-alcoholic formulation.

Among the alcohols that may be present, mention may be made of ethanol, isopropanol, propylene glycol, butoxyethanol, etc.

These alcohols may represent up to 70% of the volume of the liquid phase. Preferably, the liquid phase is water.

Said formulation is particularly suitable for the post-washing treatment (rinsing or ironing) of laundry, especially cotton-based laundry, in particular con-taining at least 35% cotton.

Said surfactant (CSA) may represent from 1% to 60% of the weight of the formulation of the invention, as a function of the concentration of said formulation.

The dry extract of a rinsing formulation is, for example, from about 10% to 50% by weight; that of an ironing formulation may be, for example, from about 0.5% to 2% by weight.

For good implementation of the invention, the ratio: mass of copolymer of controlled architecture (C)/mass of surfactant (CSA) ranges from 0.0001 to 10 and preferably from 0.001 to 2. In a rinsing formulation, this ratio may range from 0.0001 to 1, preferably from 0.0001 to 0.5 and most preferably from 0.0001 to 0.1.

In an ironing formulation, this ratio may preferably range from 0.0001 to 2.

Other common constituents may be present, along with the surfactant (CSA) and the copolymer of controlled architecture (C) in the formulations according to the invention.

The nature of these constituents depends on the desired use of said formulation.

The liquid rinsing compositions for articles made of textile fibers (especially laundry) may especially comprise at least one cationic and/or nonionic softener, for instance acyclic quaternary ammonium compounds, alkoxylated polyamides, quaternary diamido ammonium salts, quaternary ammonium esters, quaternary imidazolium salts, primary, secondary or tertiary amines, alkoxylated amines, cyclic amines, nonionic sugar derivatives, etc. mentioned especially in WO 00/68352. Examples of some of these cationic softeners have already been mentioned above as surfactant (CSA).

The softeners may be present in a proportion of from 0.5% to 90% and preferably from 0.5% to 40%, as a function of the concentration of said formulation.

The following may also be present in the rinsing formulations:

optical brighteners (0.1% to 0.2%);

color-transfer-resistance agents (polyvinylpyrrolidone, polyvinyloxazolidone, polymethacrylamide, etc., 0.03% to 25% and preferably 0.1% to 15%)

acids (hydrochloric acid, citric acid, phosphoric acid, benzoic acid, etc.) to adjust the pH if necessary silicone oils, mineral, plant, animal or hydrocarbon-based oils or waxes, dyes, fragrances, foam limiters enzymes bleaching agents.

The formulation of the invention may be used to perform a rinsing operation after an operation of hand washing or machine washing of articles made of textile fibers. Said articles may be made of natural and/or artificial and/or synthetic fibers. Said formulation is most particularly advantageous for rinsing cotton or cotton-based articles.

It may be used in the rinsing bath at a rate of from 0.001 to 5 g/l and preferably from 0.005 to 2 g/l, the proportion of formulation being expressed as solids. This rinsing operation may be performed at room temperature.

This rinsing operation makes it possible to give said articles, besides standard softness benefits provided by the cationic and/or nonionic softener(s), properties of crease resistance (antiwrinkle) and/or ease of ironing.

When it is an ironing formulation, it may also comprise, along with the surfactant (CSA) and said copolymer (C):
optionally silicone-based polymers (from 0.2% to 5%),
optionally fragrances (0.1% to 3%),
optionally cellulose-based derivatives (0.1% to 3%), for instance starch.

Said formulation may be sprayed directly onto the dry laundry before ironing. The spraying of said formulation onto the laundry makes it easier to iron and limits the creasing of the laundry when it is worn.

Preferably, the formulation of the invention is a formulation for post-washing rinsing of articles made of textile fibers.

A third subject of the invention consists of a process for improving the properties of crease resistance or ease of ironing of an aqueous or aqueous-alcoholic formulation comprising at least one cationic surfactant (CSA), for the post-washing treatment (for rinsing or ironing) of articles made of textile fibers, by addition to said formulation of at least one copolymer of controlled architecture (C) as described above, as an agent for giving said treated articles properties of crease resistance and/or ease of ironing.

The amounts of surfactant (CSA) and of copolymer (C) to be used have already been mentioned above.

The examples that follow are given as illustrations.

The abbreviations given have the following meaning:

| | |
|---|---|
| P(BuA) | Butyl acrylate (BuA) homopolymer |
| P(DMAEA) | Dimethylaminoethyl acrylate (DMAEA) block homopolymer |
| P(QuatDMAEA) | Dimethylaminoethyl acrylate methyl sulfate (QuatDMAEA) block homopolymer |
| P(AAstatQuatDMAEA) | Random block copolymer of acrylic acid and of QuatDMAEA in a 30/70 AA/QuatDMAEA weight ratio |
| K | Factor 1000 (number-average molar mass expressed in g/mol) |

EXAMPLE 1

Synthesis of a polybutyl acrylate 2000-poly-2-dimethylaminoethyl acrylate 2000 diblock copolymer 75.2 g of ethanol, 5.2 g of O-ethyl-S-(1-methoxycarbonyl)ethylenyl xanthate $(CH_3CHCO_2CH_3)S(C=S)OEt$ and 50 g of butyl acrylate are introduced into a 500 ml glass two-necked round-bottomed flask equipped with a condenser and a magnetic stirrer and maintained under argon. The solution is brought to a temperature of 70° C., and a solution of 1.64 g of azobisisobutyronitrile (AIBN) in 4.92 g of acetone and 2.46 g of ethanol is added. Two hours after this addition, a solution of 0.82 g of AIBN in 2.46 g of acetone and 1.23 g of ethanol is added. The reaction is continued for one hour after the second introduction of AIBN.

At this stage, a sample is taken. The number-average molar mass (Mn) is measured by steric exclusion chromatography in dimethylformamide, coupled to a multi-angle light-scattering detector (GPC-MALLS).

$Mn=2150$ g/mol.

A solution of 0.82 g of AIBN in 2.46 g of acetone and 1.23 g of ethanol is added to the product maintained in the reactor at 70° C. A solution of 50 g of 2-dimethyl-aminoethyl acrylate in 61.45 g of ethanol is then added over 3 hours. A solution of 0.82 g of AIBN in 2.46 g of acetone and 1.23 g of ethanol is added two, four and six hours after the end of introduction of the monomer. The reaction is stopped eight hours after the end of introduction of the monomers.

A sample is taken. The number-average molar mass (Mn) is measured by steric exclusion chromatography in dimethylformamide, coupled to a multi-angle light-scattering detector (GPC-MALLS).

$Mn=3800$ g/mol.

EXAMPLE 2

Synthesis of a polybutyl acrylate 4000-poly(2-dimethylaminoethyl acrylate 4000) diblock copolymer 75.2 g of ethanol, 2.6 g of O-ethyl-S-(1-methoxycarbonyl)ethylenyl xanthate $(CH_3CHCO_2CH_3)S(C=S)OEt$ and 50 g of butyl acrylate are introduced into a 500 ml glass two-necked round-bottomed flask equipped with a condenser and a magnetic stirrer and maintained under argon. The solution is brought to a temperature of 70° C., and a solution of 0.82 g of azobisisobutyronitrile (AIBN) in 2.46 g of acetone and 1.23 g of ethanol is added. Two hours after this addition, a solution of 0.41 g of AIBN in 1.23 g of acetone and 0.62 g of ethanol is added. The reaction is continued for one hour after the second introduction of AIBN.

At this stage, a sample is taken. The number-average molar mass (Mn) is measured by steric exclusion chromatography in dimethylformamide, coupled to a multi-angle light-scattering detector (GPC-MALLS).

$Mn=3800$ g/mol.

A solution of 0.41 g of AIBN in 1.23 g of acetone and 0.62 g of ethanol is added to the product maintained in the reactor at 70° C. A solution of 50 g of 2-dimethyl-aminoethyl acrylate in 68.25 g of ethanol is then added over 3 hours. A solution of 0.61 g of AIBN in 1.85 g of acetone and 0.92 g of ethanol is added two, four and six hours after the end of introduction of the monomer. The reaction is stopped eight hours after the end of introduction of the monomers.

A sample is taken. The number-average molar mass (Mn) is measured by steric exclusion chromatography in dimethylformamide, coupled to a multi-angle light-scattering detector (GPC-MALLS).

$Mn=7500$ g/mol.

EXAMPLE 3

Synthesis of a polybutyl acrylate 4000-poly(2-dimethylaminoethyl acrylate 8000) diblock copolymer 60.1 g of ethanol, 2.08 g of O-ethyl-S-(1-methoxycarbonyl)ethylenyl xanthate $(CH_3CHCO_2CH_3)S(C=S)OEt$ and 40 g of butyl acrylate are introduced into a 500 ml glass two-necked round-bottomed flask equipped with a condenser and a magnetic stirrer and maintained under argon. The solution is brought to a temperature of 70° C., and a solution of 0.66 g of azobisisobutyronitrile (AIBN) in 1.97 g of acetone and 0.98 g of ethanol is added. Two hours after this addition, a solution of 0.32 g of AIBN in 0.98 g of acetone and 0.49 g of ethanol is added. The reaction is continued for one hour after the second introduction of AIBN.

At this stage, a sample is taken. The number-average molar mass (Mn) is measured by steric exclusion chromatography in dimethylformamide, coupled to a multi-angle light-scattering detector (GPC-MALLS).

Mn=4100 g/mol.

A solution of 0.32 g of AIBN in 0.98 g of acetone and 0.49 g of ethanol is added to the product maintained in the reactor at 70° C. A solution of 80 g of 2-dimethyl-aminoethyl acrylate in 114.5 g of ethanol is then added over 3 hours. A solution of 0.49 g of AIBN in 1.47 g of acetone and 0.73 g of ethanol is added two, four and six hours after the end of introduction of the monomer. The reaction is stopped eight hours after the end of introduction of the monomers.

A sample is taken. The number-average molar mass (Mn) is measured by steric exclusion chromatography in dimethylformamide, coupled to a multi-angle light-scattering detector (GPC-MALLS).

Mn=10 500 g/mol.

EXAMPLE 4

Synthesis of a polybutyl acrylate 4000-poly(2-dimethylaminoethyl acrylate 20 000) diblock copolymer 30 g of ethanol, 1.04 g of O-ethyl-S-(1-methoxycarbonyl) ethylenyl xanthate (CH$_3$CHCO$_2$CH$_3$)S(C=S)OEt and 20 g of butyl acrylate are introduced into a 500 ml glass two-necked round-bottomed flask equipped with a condenser and a magnetic stirrer and maintained under argon. The solution is brought to a temperature of 70° C., and a solution of 0.32 g of azobisisobutyronitrile (AIBN) in 0.98 g of acetone and 0.49 g of ethanol is added. Two hours after this addition, a solution of 0.16 g of AIBN in 0.49 g of acetone and 0.24 g of ethanol is added. The reaction is continued for one hour after the second introduction of AIBN.

At this stage, a sample is taken. The number-average molar mass (Mn) is measured by steric exclusion chromatography in dimethylformamide, coupled to a multi-angle light-scattering detector (GPC-MALLS).

Mn=4100 g/mol.

A solution of 0.16 g of AIBN in 0.49 g of acetone and 0.24 g of ethanol is added to the product maintained in the reactor at 70° C. A solution of 100 g of 2-dimethylaminoethyl acrylate in 147 g of ethanol is then added over 3 hours. A solution of 0.24 g of AIBN in 0.73 g of acetone and 0.36 g of ethanol is added two, four and six hours after the end of introduction of the monomer. The reaction is stopped eight hours after the end of introduction of the monomers.

A sample is taken. The number-average molar mass (Mn) is measured by steric exclusion chromatography in dimethylformamide, coupled to a multi-angle light-scattering detector (GPC-MALLS).

Mn=18 000 g/mol.

EXAMPLE 5

Synthesis of a polybutyl acrylate 1000-poly(2-dimethylaminoethyl acrylate 1000) diblock copolymer 75.2 g of ethanol, 10.4 g of O-ethyl-S-(1-methoxycarbonyl)ethylenyl xanthate (CH$_3$CHCO$_2$CH$_3$)S(C=S)OEt and 50 g of butyl acrylate are introduced into a 500 ml glass two-necked round-bottomed flask equipped with a condenser and a magnetic stirrer and maintained under argon. The solution is brought to a temperature of 70° C., and a solution of 3.28 g of azobisisobutyronitrile (AIBN) in 9.85 g of acetone and 4.92 g of ethanol is added. Two hours after this addition, a solution of 1.64 g of AIBN in 4.92 g of acetone and 2.46 g of ethanol is added. The reaction is continued for one hour after the second introduction of AIBN.

At this stage, a sample is taken. The number-average molar mass (Mn) is measured by steric exclusion chromatography in dimethylformamide, coupled to a multi-angle light-scattering detector (GPC-MALLS).

Mn=1150 g/mol.

A solution of 1.64 g of AIBN in 4.92 g of acetone and 2.46 g of ethanol is added to the product maintained in the reactor at 70° C. A solution of 50 g of 2-dimethyl-aminoethyl acrylate in 47.9 g of ethanol is then added over 3 hours. A solution of 2.46 g of AIBN in 7.39 g of acetone and 3.69 g of ethanol is added two, four and six hours after the end of introduction of the monomer. The reaction is stopped eight hours after the end of introduction of the monomers.

A sample is taken. The number-average molar mass (Mn) is measured by steric exclusion chromatography in dimethylformamide, coupled to a multi-angle light-scattering detector (GPC-MALLS).

Mn=2400 g/mol.

EXAMPLE 6

Synthesis of a polybutyl acrylate 1000-poly(2-dimethylaminoethyl acrylate 5000) diblock copolymer 30.3 g of ethanol, 4.16 g of O-ethyl-S-(1-methoxycarbonyl)ethylenyl xanthate (CH$_3$CHCO$_2$CH$_3$)S(C=S)OEt and 20 g of butyl acrylate are introduced into a 500 ml glass two-necked round-bottomed flask equipped with a condenser and a magnetic stirrer and maintained under argon. The solution is brought to a temperature of 70° C., and a solution of 1.31 g of azobisisobutyronitrile (AIBN) in 3.95 g of acetone and 1.97 g of ethanol is added. Two hours after this addition, a solution of 0.65 g of AIBN in 1.97 g of acetone and 0.98 g of ethanol is added. The reaction is continued for one hour after the second introduction of AIBN.

At this stage, a sample is taken. The number-average molar mass (Mn) is measured by steric exclusion chromatography in dimethylformamide, coupled to a multi-angle light-scattering detector (GPC-MALLS).

Mn=1200 g/mol.

A solution of 0.65 g of AIBN in 1.97 g of acetone and 0.98 g of ethanol is added to the product maintained in the reactor at 70° C. A solution of 100 g of 2-dimethylaminoethyl acrylate in 139 g of ethanol is then added over 3 hours. A solution of 0.98 g of AIBN in 2.95 g of acetone and 1.47 g of ethanol is added two, four and six hours after the end of introduction of the monomer. The reaction is stopped eight hours after the end of introduction of the monomers.

A sample is taken. The number-average molar mass (Mn) is measured by steric exclusion chromatography in dimethylformamide, coupled to a multi-angle light-scattering detector (GPC-MALLS).

Mn=6400 g/mol.

EXAMPLE 7

Synthesis of a polybutyl acrylate 2000-poly(2-dimethylaminoethyl acrylate 10 000) diblock copolymer 30.1 g of ethanol, 2.08 g of O-ethyl-S-(1-methoxycarbonyl)ethylenyl xanthate $(CH_3CHCO_2CH_3)S(C=S)OEt$ and 20 g of butyl acrylate are introduced into a 500 ml glass two-necked round-bottomed flask equipped with a condenser and a magnetic stirrer and maintained under argon. The solution is brought to a temperature of 70° C., and a solution of 0.65 g of azobisisobutyronitrile (AIBN) in 1.97 g of acetone and 0.98 g of ethanol is added. Two hours after this addition, a solution of 0.33 g of AIBN in 0.98 g of acetone and 0.49 g of ethanol is added. The reaction is continued for one hour after the second introduction of AIBN.

At this stage, a sample is taken. The number-average molar mass (Mn) is measured by steric exclusion chromatography in dimethylformamide, coupled to a multi-angle light-scattering detector (GPC-MALLS).

Mn=2200 g/mol.

A solution of 0.33 g of AIBN in 0.98 g of acetone and 0.49 g of ethanol is added to the product maintained in the reactor at 70° C. A solution of 100 g of 2-dimethylaminoethyl acrylate in 144 g of ethanol is then added over 3 hours. A solution of 0.49 g of AIBN in 1.47 g of acetone and 0.73 g of ethanol is added two, four and six hours after the end of introduction of the monomer. The reaction is stopped eight hours after the end of introduction of the monomers.

A sample is taken. The number-average molar mass (Mn) is measured by steric exclusion chromatography in dimethylformamide, coupled to a multi-angle light-scattering detector (GPC-MALLS).

Mn=10 900 g/mol.

EXAMPLE 8

Synthesis of a poly(quaternized 2-dimethylaminoethyl acrylate 3700)-polybutyl acrylate 1000 diblock copolymer 75.9 g of isopropanol, 122 g of water, 2.99 g of 4,4'-azobis(4-cyanolvaleric acid) (ACP), 4.44 g of O-ethyl-S-(1-methoxycarbonyl)ethylenyl xanthate $(CH_3CHCO_2CH_3)S(C=S)OEt$ and 100 g of an 80% solution of quaternized 2-dimethylaminoethyl acrylate in water are introduced into a 500 ml glass two-necked round-bottomed flask equipped with a condenser and a magnetic stirrer, and maintained under argon. The solution is brought to a temperature of 70° C. and the reaction is maintained for 12 hours. The solvent is then evaporated off on a rotary evaporator.

$^1$H NMR analysis confirms that the acrylate monomer has been totally polymerized.

The polymer derived from the first step (87.4 g) is dissolved in 97 g of water, and 160 g of ethanol, 21.33 g of butyl acrylate and 1.75 g of AIBN are added. The mixture thus obtained is heated at 70° C. for 12 hours. At the end of the reaction, the diblock copolymer is obtained.

EXAMPLE 9

Synthesis of a poly(quaternized 2-dimethylaminoethyl acrylate 7500)-polybutyl acrylate 1000 diblock copolymer 71 g of isopropanol, 263 g of water, 3.41 g of 4,4'-azobis (4-cyanolvaleric acid) (ACP), 4.23 g of O-ethyl-S-(1-methoxycarbonyl)ethylenyl xanthate $(CH_3CHCO_2CH_3)S(C=S)OEt$ and 190.4 g of an 80% solution of quaternized 2-dimethylaminoethyl acrylate in water are introduced into a 500 ml glass two-necked round-bottomed flask equipped with a condenser and a magnetic stirrer, and maintained under argon. The solution is brought to a temperature of 70° C. and the reaction is maintained for 12 hours. The solvent is then evaporated off on a rotary evaporator.

$^1$H NMR analysis confirms that the acrylate monomer has been totally polymerized.

The polymer derived from the first step (160 g) is dissolved in 360 g of water, and 140 g of ethanol, 20.31 g of butyl acrylate and 1.67 g of AIBN are added. The mixture thus obtained is heated at 70° C. for 12 hours. At the end of the reaction, the diblock copolymer is obtained.

EXAMPLE 10

Synthesis of a polybutyl acrylate 1000-poly(acrylic acid-stat-quaternized 2-dimethylaminoethyl acrylate) 8000 diblock copolymer 124.2 g of ethanol, 13.54 g of O-ethyl-S-(1-methoxycarbonyl)ethylenyl xanthate $(CH_3CHCO_2CH_3)S(C=S)OEt$ and 65 g of butyl acrylate are introduced into a 500 ml glass two-necked round-bottomed flask equipped with a condenser and a magnetic stirrer, and maintained under argon. The solution is brought to a temperature of 70° C. and 4.27 g of azobisisobutyronitrile (AIBN) are added to the reaction mixture. The reaction is maintained at this temperature for two hours.

$^1$H NMR analysis confirms that the acrylate monomer has been totally polymerized. The molar mass of the polymer is measured by steric exclusion chromatography. Mn=1800 g/mol.

2.13 g of azobisisobutyronitrile are added to the polymer obtained from the first step, maintained at 70° C. Next, a mixture containing 173.3 g of acrylic acid, 404.7 g of quaternized 2-dimethylaminoethyl acrylate, 335 g of water and 335 g of ethanol is added over 4 hours. At the end of 2 hours of introduction, 3.2 g of AIBN are introduced. At the end of the 4 hours of introduction of the monomer solution, a further 3.2 g of AIBN are introduced into the reactor. The reaction is then maintained at this temperature for a further 2 hours.

$^1$H NMR analysis confirms that the composition of the final copolymer corresponds to the expected composition.

EXAMPLE 11

Anticreasing Evaluation Tests

The washing formulations (W), on the one hand, and the rinsing formulation (R), on the other hand, used to perform the anticreasing evaluation test are as follows:

|  | % by weight |
| --- | --- |
| Washing formulation (W) Constituents | |
| NaTPP | 40 |
| Silicate 2 $SiO_2$, $Na_2O$ | 5 |
| Sodium carbonate | 5 |
| Sodium sulfate | 8 |
| CMC Blanose 7MXF (HERCULES) | 1 |
| Perborate monohydrate | 15 |
| TAED granulate | 5 |
| Anionic surfactant Laurylbenzene sulfate (Nansa) | 6 |
| Nonionic surfactant Symperonic A3 (ethoxylated alcohol 3 EO - ICI) | 3 |
| Nonionic surfactant Symperonic A9 (ethoxylated alcohol 9 EO - ICI) | 9 |
| Enzymes (esterases, amylases, cellulase, protease) | 0.5 |
| Fragrances | 1 |
| Anionic polysaccharide (% dry weight) | 1.0 |
| Antisoiling sulfone copolyester REPEL O TEX PF 594 from Rhodia | 0.5 |
| Rinsing formulation (R) Constituents | |
| Cationic surfactant: ditallowdimethylammonium chloride | 25% |
| Fragrance | 1% |
| HCl to obtain pH = 3 | 0.2% |
| Test polymer | 2% |
| Water | 71.8% |

Evaluation Method
1. Preparation of the fabrics
2. Treatment of the fabrics: in a tergotometer by washing using the washing formulation (W) followed by rinsing using the rinsing formulation (R) containing the test polymer
3. Creasing of the fabrics
4. Evaluation of the creasing via an optical method 1. 10×10 cm samples of unfinished cotton (supplied under the reference 2436W by Phoenix Colio Ltd) are cut.

The cotton samples are first ironed so that they all have the same level of creasing before washing.

2. A washing operation is performed in a laboratory tergotometer well known in the profession of detergent compositions formulators. The machine simulates the mechanical and thermal effects of American pulsator-type washing machines. The samples are washed using the above washing formulation and rinsed twice with water and then once using the rinsing formulation (R), under the following conditions:
   number of samples per tergotometer drum: 10
   volume of water: 1 liter
   water of French hardness 30° TH obtained by suitable dilution of Contrexéville® brand mineral water
   concentration of washing formulation (W): 5 g/l
   wash temperature: 40° C.
   wash time: 20 minutes
   tergotometer spin speed: 100 rpm
   2 rinses with cold water (about 30° TH)
   third rinse: rinsing formulation (R) at a concentration of 7 g/liter in cold water of hardness 30° TH
   duration of each rinse: 5 minutes 3. The wet samples are then creased using a cylindrical press (5.5 cm in diameter×7 cm long); the pressure exerted is 20 g×$cm^{-2}$ for 90 seconds.

They are then laid to dry horizontally.

This creasing method allows reproducible creasing to be obtained on all the tests.

4. After drying for 24 hours, digital color photography is performed on an area of the dry samples, which is then converted into 256 levels of gray (gray scale from 0 to 255).

The number of pixels corresponding to each level of gray is counted. For each histogram obtained, the standard deviation $\sigma$ of the distribution of the level of gray is measured.

If the creasing is substantial, the distribution of the level of gray is large.

$\sigma 1$ corresponds to the standard deviation obtained on samples that have undergone steps 1 to 4 above, the rinsing operation in the treatment step 2 consisting, however, of three rinses with cold water (instead of two rinses with cold water followed by one rinse with the rinsing formulation (R)).

$\sigma 2$ corresponds to the standard deviation obtained with the rinsing formulation (R) containing the test polymer.

$\sigma 3$ corresponds to the standard deviation obtained on ironed starting samples (step 1 of preparation of the fabrics) that have not undergone the fabric treatment and creasing steps 2 and 3.

The performance value WR ("Wrinkle Recovery") is given by the following equation $$WR(\%) = [(\sigma 1 - \sigma 2)/\sigma 1]f \times 100$$

f being a normalization factor, equal to $1/[(\sigma 1 - \sigma 3)/\sigma 1]$

A value of:

0% corresponds to zero benefit

100% corresponds to an uncreased surface (flat surface obtained after ironing)

The results obtained are as follows:

| Block A | Block B | (C) of example | % in (R) | WR % |
| --- | --- | --- | --- | --- |
| P(BuA) 2K | P(DMAEA) 2K | 1 | 2% | 65 |
| P(BuA) 4K | P(DMAEA) 4K | 2 | 2% | 61 |
| P(BuA) 4K | P(DMAEA) 8K | 3 | 2% | 68 |
| P(BuA) 4K | P(DMAEA) 20K | 4 | 2% | 63 |
| P(BuA) 1K | P(DMAEA) 1K | 5 | 2% | 63 |
| P(BuA) 1K | P(DMAEA) 5K | 6 | 2% | 67 |
| P(BuA) 2K | P(DMAEA) 10K | 7 | 2% | 71 |
| P(BuA) 1K | P(QuatDMAEA) 3.7K | 8 | 2% | 62 |
| P(BuA) 1K | P(QuatDMAEA) 7.5K | 9 | 2% | 66 |
| P(BuA) 1K | P(AAstatQuatDMAEA) 8K | 10 | 2% | 57 |

COMPARATIVE EXAMPLE 12

Steps 1 to 4 of the above test are repeated, the rinsing formulation used to perform the third rinsing being a formulation (R') similar to (R) but free of test polymer.

The performance value WR is 30%.

It may be seen that the presence of a block copolymer in the rinsing formulation considerably improves the anticreasing properties of the rinsing formulation.

EXAMPLE 13

A "consumer" test was performed on a population of 30 individuals.

This was a visual test.

The fabrics are graded from 1 to 4, 1 corresponding to the least creased fabric and 4 to the most creased.

Fabric F1

Cotton fabrics (unfinished cotton samples, supplied under the reference 2436W by Phoenix Colio Ltd, 10×10 cm in size) are introduced into a Miele WT904 brand commercial washing machine and subjected to a 40° C. washing cycle using a commercial washing formulation, the rinsing liquid used corresponding to the rinsing formulation (R) comprising 2% of the cationic diblock copolymer P(BuA) 1K-P (QuatDMAEA) 7.5K of example 9.

The fabrics are left to air-dry.

Fabrics F2

The same washing/rinsing/drying operation is repeated on the same fabrics, using a rinsing formulation (R') similar to the previous one, but free of cationic diblock copolymer.

The percentage of individuals giving a preferential response to the fabrics F1 is 88.9%.

This confirms the results of example 11.

The invention claimed is:

1. An aqueous or aqueous-alcoholic crease-resistant formulation comprising at least one cationic surfactant (CSA), for the treatment after washing in aqueous or aqueous-alcoholic medium of articles made of textile fibers, at least one copolymer of controlled architecture (C) that is soluble or dispersible in aqueous or aqueous-alcoholic medium, compatible with the surfactant (CSA) at pH of said formulation and at pH of use of said formulation, and comprising:

at least one hydrophobic organic polymer block B, which is essentially nonionic, and at least one ionic or ionizable organic polymer block A, wherein a weight ratio of blocks B/blocks A ranges from 0.01 to 1, said copolymer of controlled architecture (C) being present in the formulation in an amount that can give said articles properties of crease resistance and/or ease of ironing.

2. The formulation as claimed in claim 1), wherein the copolymer (C) is a block copolymer, a branched copolymer or a star copolymer.

3. The formulation as claimed in claim 2), wherein the copolymer (C) is a block copolymer comprising two or three blocks.

4. The formulation as claimed in claim 3), wherein the copolymer (C) is a diblock copolymer.

5. The formulation as claimed in claim 1), wherein the blocks A and B are residues of ethylenically unsaturated monomers.

6. The formulation as claimed in claim 1), wherein the block B is a residue of at least one hydrophobic nonionic monomer, and optionally of at least one hydrophilic nonionic monomer and/or optionally of at least one ionic monomer.

7. The formulation as claimed in claim 1), wherein the block B has an average molecular mass of from 500 to 100 000 g/mol.

8. The formulation as claimed in claim 1), wherein the polymer constituting the block A is:

a) A polymer comprising a residue of at least one hydrophilic monomer that is capable of becoming cationic at the pH of the formulation or at the pH of use of the formulation and/or at least one cationic hydrophilic monomer, and optionally of at least one nonionic monomer; or b) A polymer comprising a residue of at least one zwitterionic hydrophilic monomer and optionally of at least one nonionic monomer.

9. The formulation as claimed in claim 8), wherein the block A further comprises at least one anionic or unit that is capable of becoming anionic derived from at least one anionic monomer or monomer that is capable of becoming anionic.

10. The formulation as claimed in claim 8), wherein the block A has an average molecular mass of from 500 to 100 000 g/mol.

11. The formulation as claimed in claim 1), wherein the hydrophobic block B is nonionic and wherein the ionic or ionizable block A has an overall charge that is zero or not opposite that of the cationic surfactant (CSA) at the pH of the formulation or at the pH of use of the formulation.

12. The formulation as claimed in claim 1), wherein the copolymer (C) has a number-average molecular mass of from 1000 to 200 000.

13. The formulation as claimed in claim 1), wherein the copolymer (C) is a diblock copolymer polybutyl acrylate—optionally quaternized poly(2-dimethylaminoethyl acrylate); or polybutyl acrylate—poly(acrylic acid-stat-quaternized 2-dimethylaminoethyl acrylate).

14. The formulation as claimed in claim 1), comprising a mixture of cationic surfactants, or a mixture of at least one cationic surfactant optionally having softening properties and at least one nonionic surfactant.

15. The formulation as claimed in claim 14), wherein the nonionic surfactant represents up to 70% of the weight of the cationic surfactant (CSA).

16. The formulation as claimed in claim 1), wherein said cationic surfactant (CSA) represents from 1% to 60% of the weight of the formulation.

17. The formulation as claimed in claim 1), wherein a copolymer of controlled architecture (C)/mass of surfactant (CSA) ratio represents a mass ratio ranging from 0.0001 to 10.

18. The formulation as claimed in claim 1), having a pH of from 2.5 to 11.

19. The formulation as claimed in claim 1), having a dry extract of from 10% to 50% and adapted for post-washing rinsing of articles made of textile fibers.

20. The formulation as claimed in claim 19), having a pH of from 2.5 to 11.

21. The formulation as claimed in claim 19), having a mass ratio of copolymer of controlled architecture (C)/mass of surfactant (CSA) ranging from 0.0001 to 1.

22. The formulation as claimed in claim 1), having a dry extract of from 0.5% to 2% and adapted for ironing of articles made of textile fibers.

23. The formulation as claimed in claim 22), having a pH of from 5 to 9.

24. The formulation as claimed in claim 22), having a mass ratio of copolymer of controlled architecture (C)/mass of surfactant (CSA) ranging from 0.0001 to 2.

25. The formulation as claimed in claim 6, wherein a total amount of hydrophilic nonionic monomer and ionic monomer does not exceed 10 mol % of all the monomers.

26. The formulation as claimed in claim 7, wherein the average molecular mass of block B ranges from 500 to 25 000 g/mol.

27. The formulation as claimed in claim 10, wherein the average molecular mass of block A ranges from 500 to 25 000 g/mol.

28. The formulation as claimed in claim 12, wherein the copolymer (C) has a number-average molecular mass ranges from 3000 to 30 000.

29. The formulation as claimed in claim 17, wherein the mass ratio of copolymer of controlled architecture (C)/mass of surfactant (CSA) ranges from 0.001 to 2.

30. The formulation as claimed in claim 21, wherein the mass ratio of copolymer of controlled architecture (C)/mass of surfactant (CSA) ranges from 0.0001 to 0.1.

* * * * *